United States Patent
Iida et al.

(10) Patent No.: US 10,395,798 B2
(45) Date of Patent: Aug. 27, 2019

(54) HEAT-RESISTANT INSULATED WIRE AND ELECTRODEPOSITION LIQUID USED TO FORM INSULATING LAYER THEREFOR

(71) Applicant: MITSUBISHI MATERIALS CORPORATION, Tokyo (JP)

(72) Inventors: Shintaro Iida, Naka (JP); Reiko Izumi, Osaka (JP); Hideaki Sakurai, Amagasaki (JP); Ken Hayashii, Arida (JP); Keiko Ashida, Amagasaki (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

(21) Appl. No.: 16/060,715

(22) PCT Filed: Dec. 16, 2015

(86) PCT No.: PCT/JP2015/085291
§ 371 (c)(1),
(2) Date: Jun. 8, 2018

(87) PCT Pub. No.: WO2017/104032
PCT Pub. Date: Jun. 22, 2017

(65) Prior Publication Data
US 2018/0366241 A1  Dec. 20, 2018

(51) Int. Cl.
*H01B 7/295* (2006.01)
*H01B 7/29* (2006.01)
(Continued)

(52) U.S. Cl.
CPC ............. *H01B 7/292* (2013.01); *H01B 3/10* (2013.01); *H01B 3/30* (2013.01); *H01B 3/306* (2013.01);
(Continued)

(58) Field of Classification Search
CPC ...................................................... H01B 7/295
(Continued)

(56) References Cited

U.S. PATENT DOCUMENTS 4,058,444 A    11/1977  Shibayama et al.
4,131,690 A *  12/1978  Jukes ...................... B05D 7/20
                                                      174/120 C
(Continued)

FOREIGN PATENT DOCUMENTS

CN    103858179 A    6/2014
CN    202282181 U    6/2015
(Continued)

OTHER PUBLICATIONS

International Search Report dated Feb. 9, 2016 for the corresponding PCT Patent Application No. PCT/JP2015/085291.
(Continued)

*Primary Examiner* — Chau N Nguyen
(74) *Attorney, Agent, or Firm* — Leason Ellis LLP

(57) ABSTRACT

The present invention provides an insulated wire having a heat-resistant insulating layer, wherein heat-resistant particles are contained in the insulating layer, and the heat-resistant particles are densely dispersed in a surface region of the insulating layer. For example, the concentration of heat-resistant particles included in a layer thick portion of 0.5 μm from the surface of the insulating layer is two times the concentration of heat-resistant particles included in a central portion of the insulating layer. An electrodeposition liquid used to form the insulating layer is formed by dispersing the heat-resistant particles in a suspension in which resin particles are dispersed, the viscosity is 100 cP or less, and the turbidity is 1 mg/L or more.

6 Claims, 3 Drawing Sheets

(51) Int. Cl.
*H01B 3/30* (2006.01)
*H01B 3/44* (2006.01)
*H01B 3/10* (2006.01)
*H01B 7/02* (2006.01)

(52) U.S. Cl.
CPC ............... *H01B 3/44* (2013.01); *H01B 3/447* (2013.01); *H01B 7/02* (2013.01); *H01B 7/29* (2013.01)

(58) Field of Classification Search
USPC ............................. 174/110 R, 120 R, 121 A
See application file for complete search history.

(56) References Cited

U.S. PATENT DOCUMENTS

| | | | |
|---|---|---|---|
| 9,514,859 B1* | 12/2016 | Scarpa | H01B 7/292 |
| 2002/0041960 A1 | 4/2002 | Fournier et al. | |
| 2009/0186549 A1* | 7/2009 | Bennett | E04C 2/043 |
| | | | 442/348 |
| 2010/0069545 A1 | 3/2010 | Gau et al. | |
| 2010/0108533 A1 | 5/2010 | Fujii et al. | |
| 2010/0239764 A1* | 9/2010 | Ichizawa | B30B 5/04 |
| | | | 427/336 |
| 2012/0152590 A1 | 6/2012 | Yin et al. | |
| 2012/0241191 A1 | 9/2012 | Funayama | |
| 2013/0177739 A1 | 7/2013 | Syoujiguchi | |

FOREIGN PATENT DOCUMENTS

| | | |
|---|---|---|
| CN | 204407080 U | 6/2015 |
| JP | 54-066941 A | 5/1979 |
| JP | 61-198512 A | 9/1986 |
| JP | 62-037396 A | 2/1987 |
| JP | 03-241609 A | 10/1991 |
| JP | 2000-331539 A | 11/2000 |
| JP | 2001-307557 A | 11/2001 |
| JP | 2001-338531 A | 12/2001 |
| JP | 2002-206060 A | 7/2002 |
| JP | 2013-234257 A | 11/2013 |
| WO | WO-2008/139990 A | 11/2008 |

OTHER PUBLICATIONS

Office Action dated Mar. 22, 2019 for the corresponding Chinese Patent Application No. 201580085302.6.
European Search Report dated Jun. 28, 2019 for the corresponding European Patent Application No. 15910722.6.

* cited by examiner

HEAT-RESISTANT INSULATED WIRE AND ELECTRODEPOSITION LIQUID USED TO FORM INSULATING LAYER THEREFOR

CROSS-REFERENCE TO RELATED PATENT APPLICATIONS

This application is a U.S. National Phase Application under 35 U.S.C. § 371 of International Patent Application No. PCT/JP2015/085291 filed on Dec. 16, 2015, which is incorporated herein by reference in its entirety. The International Application was published in Japanese on Jun. 22, 2017 as International Publication No. WO/2017/104032 under PCT Article 21(2).

FIELD OF THE INVENTION

The present invention relates to an insulated wire having a heat-resistant insulating layer and an electrodeposition liquid for forming the insulating layer.

BACKGROUND OF THE INVENTION

Insulated wires are widely used for magnet coils and the like. As methods for forming an insulating layer of an insulated wire, an immersion method and an electrodeposition method are known. The immersion method is a method in which a conductive wire element serving as a core material of an insulated wire is immersed in a coating material such as a resin varnish, pulled up, and dried to form an insulating coating on the surface of the wire material. The electrodeposition method is a method in which a wire material is placed in an electrodeposition liquid including a coating material component such as a resin varnish, the wire material is used as an anode or a cathode to apply an electric current between the wire material and a counter electrode, and the coating material component is electrodeposited on the wire material surface and then subjected to a baking treatment to form an insulating layer (refer to Japanese Unexamined Publication No. S62-037396 and Japanese Unexamined Publication No. H03-241609).

The immersion method has disadvantages in that it is difficult for the coating material to attach to the corners of a flat electric wire and the layer thickness at the corners is thinner than the layer thickness at the flat portion. On the other hand, in the electrodeposition method, since the coating material is sufficiently electrodeposited even at the corners of the flat wire, there is an advantage in that it is possible to form an insulating layer in which even the corners have the same thickness as the flat portion or a greater thickness than the flat portion.

In recent years, there has been a demand for insulated wires excellent in withstand voltage strength and heat resistance in order to handle a wide range of applications and, as a means for increasing the heat resistance of an insulating layer, a coating material for enameled wires which contains metal oxide fine particles and silica fine particles in the resin of an insulating layer is known (Japanese Unexamined Publication No. 2001-307557).

However, the coating material described in Japanese Unexamined Publication No. 2001-307557 is for the immersion method and is not able to be used for the electrodeposition method when the disclosed coating material has a liquid composition or is in a liquid state. In the immersion method, it is necessary to repeat immersion and drying several times in order to obtain a desired layer thickness, for example, repeating immersion seven times in order to form a coating having a layer thickness of 35 μm which is useful in practice. Therefore, productivity is low. Furthermore, the immersion method is not able to solve the disadvantage that the layer thickness at the corners becomes thinner than that of the flat portion in a flat wire material. In addition, the environmental burden is large since an organic solvent is used as a solvent and dispersion medium of the resin and oxide fine particles.

Furthermore, in the immersion method, in a case where silica fine particles are contained in the insulating layer, since the immersion in a coating material including silica fine particles is repeated, silica fine particles are included in each layer such that the silica fine particles are in a dispersed state throughout the entire insulating layer. However, since it is the surface of the insulating layer which receives the most exposure to heat at high temperatures, the insulating layer surface is easily damaged if the concentration of silica fine particles in the vicinity of the surface of the insulating layer is small.

SUMMARY OF INVENTION

Technical Problem

The present invention solves the problems described above in insulated wires formed by an immersion method in the related art and methods for manufacturing the same and provides a heat-resistant insulated wire excellent in heat resistance in the vicinity of the surface of the insulating layer and an electrodeposition liquid for forming the insulating layer.

Solution to Problem

Each aspect of the present invention has the following configuration.

[1] A heat-resistant insulated wire including a heat-resistant insulating layer, in which heat-resistant particles are contained in the insulating layer, and the heat-resistant particles are densely dispersed in a surface region of the insulating layer. The heat-resistant insulating layer described above is usually formed on the surface of the conductive wire element. The term "densely dispersed" means that the heat-resistant particles are dispersed in the surface region of the insulating layer at a relatively higher density than in the other portions of the insulating layer.

[2] The heat-resistant insulated wire according to [1], in which the heat-resistant particles are densely dispersed in a region having a thickness of 0.5 μm from the surface of the insulating layer.

[3] The heat-resistant insulated wire according to [1] or [2], in which a concentration (quantity) of the heat-resistant particles included in the region having a thickness of 0.5 μm from the surface of the insulating layer is two times or more a concentration (quantity) of the heat-resistant particles included in a central portion of the insulating layer in a thickness direction. More preferably, the density of the heat-resistant particles included in the 0.5 μm region is 2 to 6 times the density of the heat-resistant particles included in the central portion in the thickness direction of the insulating layer.

[4] An electrodeposition liquid for forming an insulating layer, used for forming the insulating layer of the insulated wire according to [1], in which the heat-resistant particles are dispersed in a suspension in which resin particles are dispersed, with a viscosity of 100 cP or less and a turbidity of 1 mg/L or more. More preferably, the viscosity of the electrodeposition liquid is 0.5 to 50 cP and the turbidity is 10 to 600 mg/L.

[5] The electrodeposition liquid for forming an insulating layer according to [4], in which the amount of the resin particles is 1 to 30% by mass and the amount of the heat-resistant particles is 1 to 100 parts by mass with respect to 100 parts by mass of the resin particles.

[6] The electrodeposition liquid for forming an insulating layer according to [4] or [5], in which an average particle diameter of the resin particles is 1 µm or less and an average particle diameter of the heat-resistant particles is 500 nm or less. The average particle diameter of the resin particles is more preferably 10 to 100 nm, and the average particle diameter of the heat-resistant particles is more preferably 0.5 to 400 nm.

[7] The electrodeposition liquid for forming an insulating layer according to any one of [4] to [6], which forms an insulating layer in which a cut through temperature increasing rate of the insulating layer is 1.2 or more. The cut through temperature increasing rate of the insulating layer is more preferably 1.2 to 1.6.

[8] The electrodeposition liquid for forming an insulating layer according to any one of [5] to [7], in which the resin particles are one kind or two or more kinds selected from an acrylic resin, a polyesterimide resin, a polyimide resin, or a polyamideimide resin.

[9] The electrodeposition liquid for forming an insulating layer according to any one of [5] to [8], in which the heat-resistant particles are one kind or two or more kinds selected from metal oxide fine particles, metal nitride fine particles, boron nitride fine particles, and silica fine particles. As the metal oxide, it is possible to use one kind or a mixture of two or more kinds selected from alumina, zirconia, and the like, and, as the metal nitride, it is possible to use one kind or a mixture of two or more kinds selected from aluminum nitride, boron nitride, and the like.

Advantageous Effects of Invention

In a heat-resistant insulated wire according to one aspect of the present invention, since heat-resistant particles are densely dispersed on the surface portion of the insulating layer, the surface portion of the insulating layer which receives the most exposure to heat at high temperature has high heat resistance. Therefore, it is possible to obtain excellent heat resistance even if the total concentration of heat-resistant particles included in the insulating layer as a whole is small.

In the electrodeposition liquid according to another aspect of the present invention, it is possible to form an insulating layer in which heat-resistant particles are densely dispersed in the surface portion. Accordingly, it is possible to obtain an insulated coated wire having a high cut through temperature. For example, it is possible to form a heat-resistant insulating coating where the cut through temperature increasing rate represented by the equation of [cut through temperature (° C.) of insulating layer]/[cut through temperature (° C.) of insulating layer resin] is 1.2 or more, preferably 1.2 to 1.6, and more preferably 1.3 to 1.5.

Since the electrodeposition liquid described above is used in the electrodeposition method, it is possible to obtain a desired layer thickness by a single electrodeposition treatment. In addition, it is possible to uniformly form an insulating coating on the corners of a flat wire. Furthermore, since it is possible to use water as a dispersion medium for the electrodeposition liquid, the environmental burden is small.

DETAILED DESCRIPTION OF THE INVENTION

A heat-resistant insulated wire according to one embodiment of the present invention is an insulated wire having a conductive wire element and a heat-resistant insulating layer provided on the surface of the conductive wire element, in which heat-resistant particles are contained in the insulating layer and the heat-resistant particles are densely dispersed in a surface region of the insulating layer. The conductive wire element may be any commonly used metal such as copper, copper alloy, silver, silver alloy, aluminum, and aluminum alloy. In addition, the shape thereof may be any shape having a circular cross-section, an elliptical cross-section, a quadrangular cross-section, a flat plate cross-section, or the like. The insulating layer is formed with a substantially uniform thickness on the surface of the conductive wire element in a case where the conductive wire element has a circular cross-section or an elliptical cross-section. On the other hand, in a case where the conductive wire element has a cross-sectional shape with corners, the insulating layer is formed to be relatively thicker (for example, approximately 10 to 30% thicker) at the corners than at the other portions.

The surface region of the insulating layer is a region from the surface of the insulating layer to a distance (depth) of up to 0.5 µm, on a perpendicular line connecting the surface of the conductive wire element of the insulated wire and the insulating layer surface. In general, the layer thickness of the entire insulating layer is approximately 2 to 50 µm, and usually 3 to 30 µm.

In the heat-resistant insulated wire according to the present embodiment, preferably, the concentration (quantity) of the heat-resistant particles included in the region of 0.5 µm from the surface of the insulating layer is two times or more the concentration (quantity) of the heat-resistant particles included in the central portion in the thickness direction of the insulating layer. With respect to the layer thickness L of the entire insulating layer on the perpendicular line connecting the surface of the conductive wire element and the surface of the insulating layer, the central portion in the thickness direction of the insulating layer is a range from a position of ⅓ L to a position of ⅔ L from the surface of the insulating layer.

Figure 1:
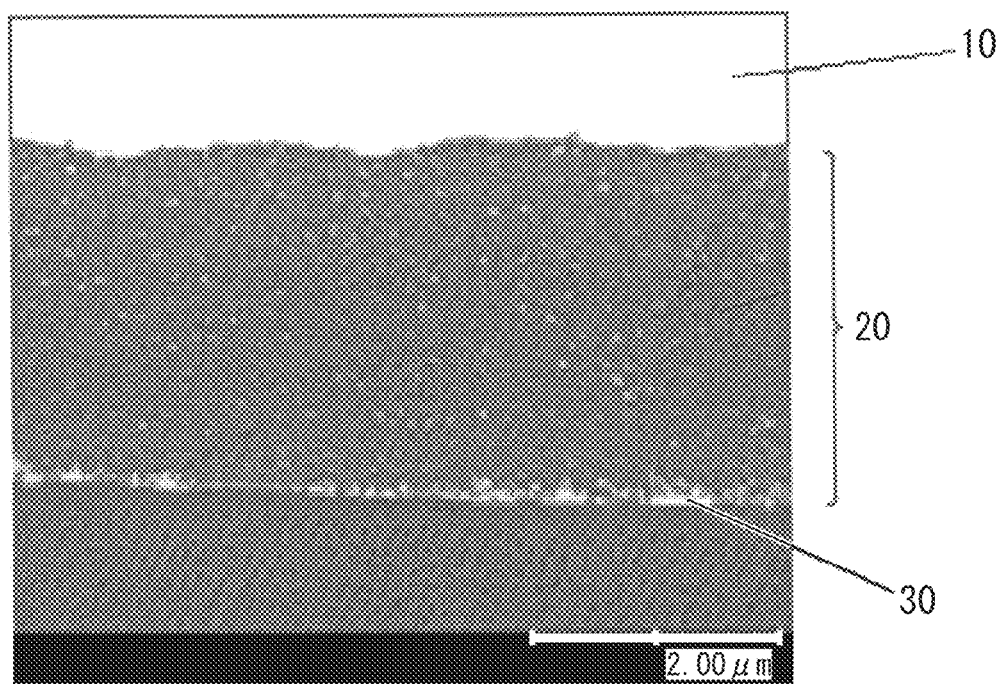
FIG. 1 is a partial cross-sectional photograph of an insulated wire formed in Example 1.

An example of the heat-resistant insulated wire of the present embodiment is shown in FIG. 1. FIG. 1 is a partial cross-sectional view of a heat-resistant insulated wire according to the present embodiment. This heat-resistant insulated wire has a conductive wire element 10 (copper wire 10 in the shown example) and an insulating layer 20 formed of a heat-resistant resin covering the copper wire 10 with a certain thickness, and heat-resistant particles 30 are included in the insulating layer 20. In the diagram, the white spots inside the insulating layer 20 are the heat-resistant particles 30. The heat-resistant particles 30 in the example shown are silica fine particles. As shown in the diagram, white spots are densely dispersed in the region of 0.5 μm from the surface of the insulating layer 20, and it is understood that the heat-resistant particles 30 are unevenly distributed in this portion.

Figure 2:
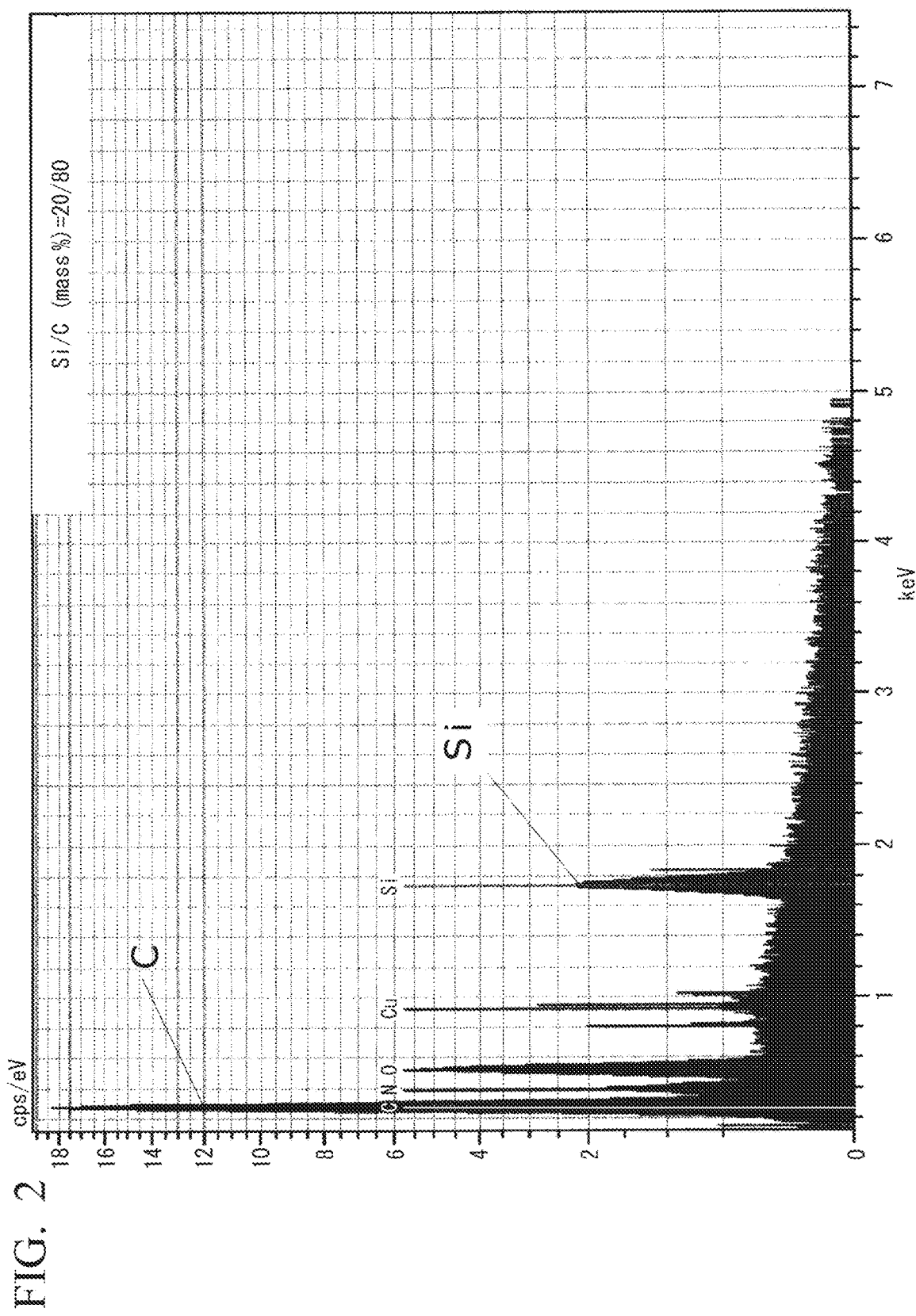
FIG. 2 is an EDS analysis chart at a position at a distance of 0.25 µm from the insulating layer surface on a perpendicular line connecting the surface of a copper wire 10 and the surface of an insulating layer 20 in FIG. 1.
Figure 3:
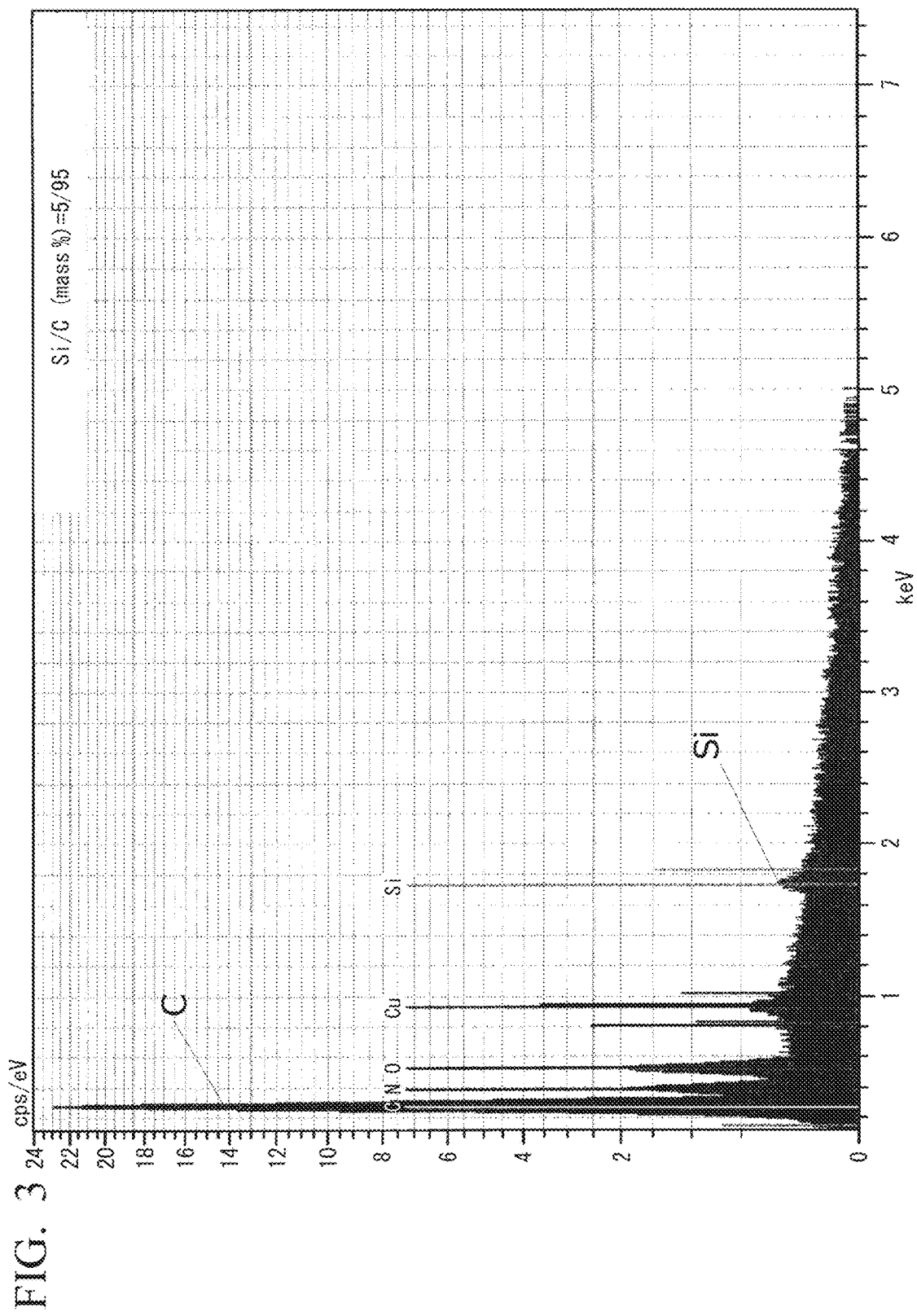
FIG. 3 is an EDS analysis chart at a position at a distance from the surface of the insulating layer which is ½ of the layer thickness of the entire insulating layer on the perpendicular line connecting the surface of the copper wire 10 and the surface of the insulating layer 20 in FIG. 1.

FIG. 2 and FIG. 3 show the results of elemental analysis by energy-dispersive X-ray spectroscopy analysis (referred to below as EDS analysis) for the elements included in the cross-sectional portion shown in FIG. 1. FIG. 2 is a chart of EDS analysis results at a position at a distance 0.25 μm from the surface of the insulating layer on a perpendicular line connecting the surface of the copper wire 10 and the surface of the insulating layer 20. FIG. 3 is a chart of EDS analysis results at a position at a distance of ½ (the thickness center) of the layer thickness of the entire insulating layer from the surface of the insulating layer on a perpendicular line connecting the surface of the copper wire 10 and the surface of the insulating layer 20. The region to be analyzed on the sample surface is a circle with a diameter of 1 μm.

The ratio (Si/C) of the silicon intensity peak (Si in the diagram) to the carbon intensity peak (C in the diagram) is the average value obtained after performing analysis five times and Si/C=20/80 in FIG. 2, but Si/C=5/95 in FIG. 3, and the concentration of silica fine particles included in the surface region of the insulating layer shown in FIG. 2 is approximately four times the concentration of silica fine particles included in the central portion of the insulating layer shown in FIG. 3.

In the heat-resistant insulated wire according to the present embodiment, the heat-resistant particles included in the insulating layer are densely dispersed in the surface region of the insulating layer and, for example, in the shown example, since the concentration of silica fine particles included in the surface region of the insulating layer is approximately four times the concentration of silica fine particles included in the insulating layer central portion, the heat resistance of the surface region which receives the most exposure to heat at high temperatures is high. Therefore, it is possible to obtain excellent heat resistance even if the concentration of heat-resistant particles included in the insulating layer as a whole is small.

The insulating layer is formed of an acrylic resin, a polyesterimide resin, a polyimide resin, or the like, and the heat-resistant particles included in the insulating layer are one kind or two or more kinds selected from metal oxide fine particles, metal nitride fine particles, boron nitride fine particles, silica fine particles, or the like. The metal oxide is one kind or a mixture of two or more kinds selected from alumina and zirconia, and the metal nitride is one kind or a mixture of two or more kinds selected from aluminum nitride and boron nitride, or the like. Alumina and zirconia are particularly preferable.

It is possible to form the insulating layer using the following electrodeposition liquid. The electrodeposition liquid of the present embodiment is a suspension in which resin particles and heat-resistant particles are dispersed in a solvent. It is possible to obtain this electrodeposition liquid by mixing a suspension in which resin particles are dispersed and a suspension in which heat-resistant particles are dispersed. The dispersion medium of the resin particle suspension may be any liquid used in the electrodeposition method and it is possible to use water or a mixture of water and an aprotic polar solvent, such as a mixture of water and N,N dimethylformamide, a mixture of water and N methylpyrrolidone, a mixture of water and dimethyl sulfoxide, or the like. For the dispersion medium of the heat-resistant particle suspension, a dispersion medium having good compatibility with the resin particle suspension is suitable, for example, one kind or a mixture of two or more kinds selected from water, methanol, methyl ethyl ketone, and the like may be used.

The electrodeposition liquid of the present embodiment is a suspension in which resin particles and heat-resistant particles are dispersed with a turbidity of 1 mg/L or more, preferably a turbidity of 10 to 600 mg/L. It is possible to measure turbidity with a commercially available integrating spherical turbidimeter or the like. When the turbidity of the electrodeposition liquid is less than 1 mg/L, the dispersion state of the resin particles and the heat-resistant particles in the liquid is insufficient and the concentration of resin particles and heat-resistant particles is insufficient, thus, it is difficult to form an insulating layer having a sufficient thickness. If the turbidity of the electrodeposition liquid is 1 mg/L or more, the dispersion state of the resin particles and the heat-resistant particles in the liquid is good, and a sufficient concentration of resin particles and heat-resistant particles are included, thus, it is possible to form an insulating layer having good heat resistance.

In the electrodeposition method, an insulating layer is formed by passing mainly direct current between the conductive wire element immersed in the electrodeposition liquid and a counter electrode and electrically moving and electrodepositing the resin particles and the heat-resistant particles in the liquid to the wire material surface, and the electrodeposition liquid is required to have a low viscosity such that the liquid does not solidify. If the viscosity of the electrodeposition liquid is excessively high, the liquid solidifies and use for film formation is no longer possible. The viscosity of the electrodeposition liquid is preferably 100 cP or less, and more preferably 0.5 to 90 cP. When the viscosity of the electrodeposition liquid is 100 cP or less, it is possible to form a good insulating layer without solidification of the liquid.

On the other hand, in the immersion method, a coating material for forming an insulating layer is used. When this coating material is applied to the surface of the conductive wire element of the insulated wire, a high viscosity liquid is used such that the coating material does not flow down. In general, the coating material which forms the coating used in the immersion method has a viscosity of 1000 cP or more. Since the resin component of the coating material which forms the coating for the immersion method is dissolved in the coating material and not a suspension in which the resin particles are dispersed in the liquid, the turbidity of the coating material is generally less than 0.01 mg/L, which is a liquid which transmits light.

In addition, in the immersion method, specifically, a coating material using a polyurethane resin, a polyester resin, a formal resin, a polyesterimide resin, a polyamideimide resin, or a polyimide resin is used, and the viscosity of these coating materials is 1000 cP or more and the turbidity is less than 0.01 mg/L, and the viscosity and turbidity of the liquid are totally different from those of the electrodeposition liquid for forming the insulating layer of the present invention. The viscosity of the electrodeposition liquid of the present embodiment is far lower than that of the coating material for insulating layer used in the immersion method.

The kind of the resin particles included in the electrodeposition liquid of the present embodiment is one kind or a mixture of two or more kinds selected from an acrylic resin, a polyesterimide resin, a polyimide resin, or the like. The average particle diameter of the resin particles is preferably 1 μm or less, and more preferably 10 to 100 nm. When resin particles having an average particle diameter of 1 μm or less are used, the dispersion stability of the resin particles is improved. The amount of the resin particles included in the electrodeposition liquid of the present invention is preferably 1 to 30% by mass. Since the electrodeposition liquid of the present invention contains the resin particle content described above, it is possible to form an insulating layer having a sufficient thickness. The shape of the resin particle may be a spherical shape, an ellipsoidal shape, or another irregular shape. It is possible to determine the average particle diameter of the resin particles using a commercially available dynamic light scattering type particle diameter distribution measuring apparatus.

The heat-resistant particles are dispersed in the electrodeposition liquid of the present embodiment along with the resin particles described above. The heat-resistant particles described above are one kind or two or more kinds selected from metal oxide fine particles, metal nitride fine particles, boron nitride fine particles, and silica fine particles. As the metal oxide, it is possible to use for example, one kind or a mixture of two or more kinds selected from alumina and zirconia, and, as the metal nitride, it is possible to use one kind or a mixture of two or more kinds selected from aluminum nitride and boron nitride, or the like. In order to uniformly disperse the heat-resistant particles in the suspension of the resin particles, the heat-resistant particles are dispersed in advance in a dispersion medium having good compatibility with the suspension, and this dispersion liquid may be mixed with the suspension of the resin particles.

The heat-resistant particles are preferably colloidal particles of 500 nm or less, and more preferably particles of 0.5 to 400 nm. Since the colloidal particles having the particle diameter described above are dispersed without sedimentation in the liquid, it is possible to form a heat-resistant coating uniformly including heat-resistant particles. The shape of the heat-resistant particles may be a spherical shape, an ellipsoidal shape, or another irregular shape. It is also possible to determine the average particle diameter of the heat-resistant particles using a commercially available dynamic light scattering type particle diameter distribution measuring apparatus.

The amount of the heat-resistant particles is preferably 1 to 100 parts by mass with respect to 100 parts by mass of the resin particles. If the content is less than 1 part by mass, the heat resistance of the insulating layer is insufficient, and when the content exceeds 100 parts by mass, the flexibility of the insulating layer decreases. Since the electrodeposition liquid of the present invention includes the heat-resistant particle content described above, it is possible to form an insulating layer having sufficient heat resistance and flexibility. The content is more preferably 20 to 80 parts by mass with respect to 100 parts by mass of the resin particles.

Using the electrodeposition liquid of the present embodiment, an electrodeposition film is formed by applying electricity between the conductive wire element immersed in the electrodeposition liquid and the counter electrode. The energization conditions at this time are the same as those in the case of using a general electrodeposition liquid. For example, it is possible to perform electrodeposition with a DC voltage of 5 to 100 V, an electrodeposition time of 0.1 to 30 seconds, and an electrodeposition liquid temperature of 5 to 40° C. Since the charged states of the heat-resistant particles and the resin particles are different and the resin particles are more easily electrodeposited than the heat-resistant particles, the concentration of the heat-resistant particles is higher on the surface of the electrodeposition film.

Baking is performed after the electrodeposition described above. The baking conditions may be the same as in the case of using a general electrodeposition liquid. For example, the conductive wire element having the electrodeposition film formed thereon may be placed in a baking furnace, heated at 200 to 600° C. for 2 to 120 seconds, and baked to form an insulating film.

As described above, using the electrodeposition liquid of the present embodiment makes it possible to form an insulating layer in which heat-resistant particles are densely dispersed in the surface region.

Since the heat-resistant particles are densely dispersed on the surface portion of the insulating layer in the heat resistant insulated wire of the present embodiment, the surface portion of the insulating layer which receives the most exposure to heat at high temperatures has high heat resistance. Therefore, it is possible to obtain excellent heat resistance even if the concentration of heat-resistant particles included in the insulating layer as a whole is small.

The electrodeposition liquid of the present embodiment makes it possible to form an insulating layer in which heat-resistant particles are densely dispersed in the surface portion. Accordingly, it is possible to obtain an insulated coated wire having a high cut through temperature. Specifically, for example, it is possible to form a heat-resistant insulating coating where the cut through temperature increasing rate represented by the equation of [cut through temperature (° C.) of insulating layer]/[cut through temperature (° C.) of insulating layer] is 1.3 or more, and preferably 1.2 to 1.5.

Since the electrodeposition liquid of the present embodiment is used in the electrodeposition method, it is possible to obtain a desired layer thickness by a single electrodeposition treatment. It is also possible to uniformly form an insulating coating at the corners of the flat wire. Furthermore, since it is possible to use water or a water mixture as a dispersion medium for the electrodeposition liquid, the environmental burden is small.

EXAMPLE

Examples of the present invention are shown below together with Comparative Examples.

Examples 1 to 13

Acrylic resin particles having an average particle diameter of 50 nm were dispersed in water to obtain an aqueous suspension having a resin particle concentration of 20% by mass. Silica particles having an average particle diameter of 10 nm or an average particle diameter of 360 nm were dispersed in water to obtain a silica sol having a silica particle concentration of 30% by mass and 70% by mass of water. Furthermore, the aqueous suspension and the silica sol described above were mixed at various ratios to prepare a plurality of kinds of aqueous dispersion type electrodeposition liquids. Table 1 shows the parts by mass of the silica particles with respect to 100 parts by mass of the resin particles in the electrodeposition liquid. Table 1 shows the turbidity, viscosity, liquid state, resin particle concentration, and average particle diameter of the resin particles of each electrodeposition liquid.

The water content of each of the electrodeposition liquids described above was adjusted such that the resin particle concentrations were the values shown in Table 1. The average particle diameter of the acrylic resin particles and the silica particles was measured using a dynamic light scattering type particle diameter distribution measuring apparatus (LB 550: trade name) manufactured by Horiba. The turbidity of the electrodeposition liquid was measured with an integrating sphere type turbidimeter (ANA-148: trade name) manufactured by Tokyo Photoelectric Co., Ltd. The viscosity of the electrodeposition liquid was measured using a thin tube viscometer according to JIS (Z 8803: 2011-6).

Each electrodeposition liquid was placed in an electrodeposition bath at 25° C. and a copper wire of φ0.1 mm was passed through the electrodeposition bath at a rate of 15 m/min, energization was performed using the copper wire as an anode and the electrodeposition bath as a cathode, and acrylic resin and silica particles were electrodeposited and coated on the copper wire surface. After electrodeposition, a mist treatment with DMF was carried out, and the processed wire material was passed through a baking furnace and subjected to a baking treatment at a heating temperature of 300° C. for a heating time of 10 seconds to form an insulating layer with a thickness of 10 μm on the copper wire surface.

For these insulated wires, the flexibility, the cut through temperature, the cut through temperature increasing rate, and the ratio of the concentration of heat-resistant particles in the surface region of the insulating layer with respect to the concentration of heat-resistant particles in the central portion of the insulating layer were measured. The results are shown in Table 1.

After being wound around itself according to JIS (C 3005: 2000-4.20.1), the presence or absence of peeling of the insulating layer was checked with an optical microscope, the absence of peeling was indicated by "O", and presence of peeling was indicated by X. The cut through temperature was measured according to JIS (C3216-6: 2011-4). The cut through temperature increasing rate was obtained using the equation of [cut through temperature of insulating layer (° C.)]/[cut through temperature of insulating layer resin (° C.)]. The ratio of the concentration of heat-resistant particles in the surface region of the insulating layer to the concentration of heat-resistant particles in the central portion of the insulating layer was measured in the same manner as the Si/C ratio measuring method described above.

Example 14 to Example 23

Zirconia particles having an average particle diameter of 100 nm were dispersed in water to obtain a zirconia sol having a zirconia particle concentration of 30% by mass and 70% by mass of water. In addition, alumina particles having an average particle diameter of 50 nm were dispersed in water to obtain an alumina sol having an alumina particle concentration of 30% by mass and 70% by mass of water. A water dispersion type electrodeposition liquid was prepared in the same manner as in Examples 1 to 13 except that these sols were used. Table 2 shows the parts by mass of the zirconia particles or alumina particles with respect to 100 parts by mass of the resin particles in the electrodeposition liquid. Table 2 shows the turbidity, viscosity, liquid state, resin particle concentration, and average particle diameter of the resin particles of the electrodeposition liquid. The water content of the electrodeposition liquid was adjusted such that the resin particle concentrations were the values in Table 2. The average particle diameter of the acrylic resin particles and the silica particles and the turbidity and viscosity of the electrodeposition liquid were measured in the same manner as in Examples 1 to 13.

Using these electrodeposition liquids, insulating layers having a thickness of 10 μm were formed in the same manner as in Examples 1 to 13. For this insulated wire, the flexibility, the cut through temperature, the cut through temperature increasing rate, and the ratio of the concentration of heat-resistant particles in the surface region of the insulating layer with respect to the concentration of heat-resistant particles in the central portion of the insulating layer were measured. The results are shown in Table 2. The flexibility, cut through temperature, and cut through temperature increasing rate were measured in the same manner as in Examples 1 to 13. The ratio of the concentration of heat-resistant particles in the surface region of the insulating layer to the concentration of heat-resistant particles in the central portion of the insulating layer was measured in the same manner as in the method for measuring the Si/C ratio, except that, in Examples 14 to 18, Zr was substituted for Si, and in Examples 19 to 23, Al was substituted for Si.

Example 24 to Example 30

The polyesterimide resin particles having an average particle diameter of 200 nm were dispersed in water to obtain an aqueous suspension having a resin particle concentration of 20% by mass. Silica particles having an average particle diameter of 10 nm were dispersed in water to obtain a silica sol having a silica particle concentration of 30% by mass and 70% by mass of water. Furthermore, the above were mixed at various ratios to prepare a plurality of aqueous dispersion type electrodeposition liquids. Table 3 shows the parts by mass of the silica particles with respect to 100 parts by mass of the resin particles in each electrodeposition liquid. The turbidity, viscosity, liquid state, resin particle concentration, and average particle diameter of resin particles of the electrodeposition liquid were measured. The results are shown in Table 3. The water content of the electrodeposition liquids was adjusted such that the resin particle concentrations were the values shown in Table 3. The average particle diameters of the polyesterimide resin particles and the silica particles and the turbidity and viscosity of the electrodeposition liquid described above were measured in the same manner as in Examples 1 to 13.

Using these electrodeposition liquids, insulating layers having a thickness of 10 μm were formed in the same manner as in Examples 1 to 13. For these insulated wires, the flexibility, the cut through temperature, the cut through temperature increasing rate, and the ratio of the concentration of heat-resistant particles in the surface region of the insulating layer with respect to the concentration of heat-resistant particles in the central portion of the insulating layer were measured. The results are shown in Table 3. The flexibility, the cut through temperature, the cut through temperature increasing rate, and the ratio of the concentration of heat-resistant particles in the surface region of the insulating layer with respect to the concentration of heat-resistant particles in the central portion of the insulating layer were measured in the same manner as in Example 1 to Example 13.

Example 31 to Example 35

Polyimide resin particles having an average particle diameter of 400 nm were dispersed in water to obtain an aqueous suspension having a resin particle concentration of 20% by mass. Silica particles having an average particle diameter of 10 nm were dispersed in water to obtain a silica sol having a silica particle concentration of 30% by mass and 70% by mass of water. Furthermore, the above were mixed to prepare an aqueous dispersion type electrodeposition liquid. Table 3 shows the parts by mass of the silica particles with respect to 100 parts by mass of the resin particles in the electrodeposition liquid described above. Table 3 shows the turbidity, viscosity, liquid state, resin particle concentration, and average particle diameter of the resin particles of the electrodeposition liquid. The water content of the electrodeposition liquid was adjusted such that the resin particle concentrations were the values shown in Table 3. The average particle diameters of the polyimide resin particles and the silica particles and the turbidity and viscosity of the electrodeposition liquid were measured in the same manner as in Examples 1 to 13.

Using these electrodeposition liquids, insulating layers having a thickness of 10 μm were formed in the same manner as in Examples 1 to 13. For these insulated wires, the flexibility, the cut through temperature, the cut through temperature increasing rate, and the ratio of the concentration of heat-resistant particles in the surface region of the insulating layer with respect to the concentration of heat-resistant particles in the central portion of the insulating layer were measured. The results are shown in Table 3.

The flexibility, the cut through temperature, the cut through temperature increasing rate, and the ratio of the concentration of heat-resistant particles in the surface region of the insulating layer with respect to the concentration of heat-resistant particles in the central portion of the insulating layer were measured in the same manner as in Example 1 to Example 13.

Example 36 to Example 40

Polyamideimide resin particles having an average particle diameter of 300 nm were dispersed in water to obtain an aqueous suspension having a resin particle concentration of 20% by mass. Silica particles having an average particle diameter of 10 nm were dispersed in water to obtain a silica sol having a silica particle concentration of 30% by mass and 70% by mass of water. Furthermore, the above were mixed to prepare an aqueous dispersion type electrodeposition liquid. Table 4 shows the parts by mass of the silica particles with respect to 100 parts by mass of the resin particles in the electrodeposition liquid. Table 4 shows the turbidity, viscosity, liquid state, resin particle concentration, and average particle diameter of the resin particles of the electrodeposition liquid described above. The water content of the electrodeposition liquid was adjusted such that the resin particle concentrations were the values shown in Table 4. The average particle diameter of the polyimide resin particles and silica particles and the turbidity and viscosity of the electrodeposition liquid were measured in the same manner as in Examples 1 to 13.

Using these electrodeposition liquids, insulating layers having a thickness of 10 μm were formed in the same manner as in Examples 1 to 13. For these insulated wires, the flexibility, the cut through temperature, the cut through temperature increasing rate, and the ratio of the concentration of heat-resistant particles in the surface region of the insulating layer with respect to the concentration of heat-resistant particles in the central portion of the insulating layer were measured. The results are shown in Table 4.

The flexibility, the cut through temperature, the cut through temperature increasing rate, and the ratio of the concentration of heat-resistant particles in the surface region of the insulating layer with respect to the concentration of heat-resistant particles in the central portion of the insulating layer were measured in the same manner as in Example 1 to Example 13.

In the electrodeposition liquids of Examples 1 to 40, all the electrodeposition liquids had a turbidity of 30 mg/L or more and a viscosity of 100 cP or less, the cut through temperature of the formed insulating layer was 400° C. or more, the cut through temperature increasing rate was 1.2 or more, and the heat resistance was high. In addition, in all of the resin types, the cut through temperature and the cut through temperature increasing rate were increased according to the amount of the heat-resistant particles. In Example 8, since the amount of silica particles was large, peeling of the insulating layer occurred in the flexibility test. From this result, it was found that the concentration of heat-resistant particles is preferably 1 to 100 parts by mass with respect to 100 parts by mass of the resin particles.

Comparative Example 1 to Comparative Example 4

Acrylic resin particles having an average particle diameter of 50 nm, polyesterimide resin particles having an average particle diameter of 200 nm, polyimide resin particles having an average particle diameter of 400 nm, and polyamideimide resin particles having an average particle diameter of 300 nm were each dispersed in water to obtain aqueous suspensions with a resin particle concentration of 20% by mass, which were used as the electrodeposition liquids. Table 5 shows the turbidity, viscosity, liquid state, resin particle concentration, and average particle diameter of the resin particles of the electrodeposition liquid described above. The water amount of the electrodeposition liquids was adjusted such that the resin particle concentrations were the values shown in Table 5. The average particle diameter of the resin particles and the turbidity and viscosity of the electrodeposition liquid were measured in the same manner as in Examples 1 to 13.

Using these electrodeposition liquids, insulating layers having a thickness of 10 μm were formed in the same manner as in Examples 1 to 13. For these insulated wires, the flexibility, the cut through temperature, and the cut through temperature increasing rate were measured. The results are shown in Table 5. The flexibility, the cut through temperature, and cut through temperature increasing rate were measured in the same manner as in Examples 1 to 13.

In Comparative Examples 1 to 4, the insulating layer was formed by the electrodeposition method, but since heat-resistant particles were not included, the cut through temperature did not rise and the cut through temperature increasing rate was 1 for all cases.

Comparative Example 5

Silica particles having an average particle diameter of 10 nm were dispersed in a mixed solution of xylene and butanol to obtain a silica sol. Using a coating material in which a polyesterimide resin was dissolved, the silica sol described above was mixed with the coating material described above while stirring the coating material, and the silica particles were dispersed to be 20 parts by mass with respect to 100 parts by mass of the resin component of the coating material.

The turbidity, viscosity, liquid state, and resin concentration of the electrodeposition liquid are shown in Table 5. The amount of xylene and butanol in the electrodeposition liquid was adjusted such that the resin particle concentration was the value shown in Table 5. The turbidity and viscosity of the electrodeposition liquid were measured in the same manner as in Examples 1 to 13. Using this electrodeposition liquid, the formation of an insulating layer was attempted in the same manner as in Examples 1 to 13, but since the electrodeposition liquid had a turbidity of less than 0.01 mg/L and a viscosity of more than 1000 cP, it was not possible to form the insulating layer by electrodeposition.

Comparative Example 6

Polyesterimide resin particles having an average particle diameter of 200 nm were dispersed in water to obtain an aqueous suspension having a resin particle concentration of 40% by mass. Silica particles having an average particle diameter of 10 nm were dispersed in water to obtain a silica sol having a silica particle concentration of 30% by mass and 70% by mass of water. The aqueous suspension and the silica sol were mixed such that the silica particles were 1 part by mass with respect to 100 parts by mass of the polyesterimide resin to obtain an electrodeposition liquid. The turbidity, viscosity, liquid state, resin particle concentration, and average particle diameter of the resin particles of the electrodeposition liquid are shown in Table 5. The water content of the electrodeposition liquid was adjusted such that the resin particle concentration was the value shown in Table 5. The average particle diameter of the resin particles and the turbidity and viscosity of the electrodeposition liquid were measured in the same manner as in Examples 1 to 13. Using these electrodeposition liquids, the formation of an insulating layer was attempted in the same manner as in Examples 1 to 13, but since the resin particle concentration was high and the viscosity of the electrodeposition liquid was excessively high, the liquid solidified and electrodeposition was not possible.

Comparative Example 7

Silica particles having an average particle diameter of 10 nm were dispersed in a mixed solution of xylene and butanol to obtain a silica sol. Using a coating material in which tris-hydroxyethyl isocyanurate modified polyesterimide was dissolved, the silica sol described above was mixed with the coating material described above while stirring the coating material, and dispersion was carried out such that the silica particles were 20 parts by mass with respect to 100 parts by mass of the resin component of the coating material. Using this coating material, the formation of an insulating layer using the electrodeposition method was attempted in the same manner as in Examples 1 to 13, but since the liquid was a liquid in which the resin component was dissolved, it was not possible to form an insulating layer by the electrodeposition method.

TABLE 1

| | | | Example No. | | | | | | |
|---|---|---|---|---|---|---|---|---|---|
| | | | 1 | 2 | 3 | 4 | 5 | 6 | 7 |
| Electrodeposition liquid | Resin | Acrylic resin | 100 | 100 | 100 | 100 | 100 | 100 | 100 |
| | | Polyesterimide resin | — | — | — | — | — | — | — |
| | | Polyimide resin | — | — | — | — | — | — | — |
| | | Polyamideimide resin | — | — | — | — | — | — | — |
| | Heat-resistant particles | Silica sol (average particle diameter 10 nm) | 100 | 80 | 50 | 20 | 1 | 1 | 1 |
| | | Silica sol (average particle diameter 360 nm) | — | — | — | — | — | — | — |
| | | Zirconia sol (average particle diameter 100 nm) | — | — | — | — | — | — | — |
| | | Alumina sol (average particle diameter 50 nm) | — | — | — | — | — | — | — |
| | | Turbidity (mg/L) | 30 | 30 | 30 | 30 | 30 | 50 | 70 |
| | | Viscosity (cP) | 1 | 1 | 1 | 1 | 1 | 70 | 90 |
| | | Liquid state | Aqueous dispersion | Aqueous dispersion | Aqueous dispersion | Aqueous dispersion | Aqueous dispersion | Aqueous dispersion | Aqueous dispersion |
| | | Resin concentration (mass %) | 5 | 5 | 5 | 5 | 5 | 10 | 20 |
| | | Average particle diameter of resin particles (nm) | 50 | 50 | 50 | 50 | 50 | 50 | 50 |
| Insulating coating | | Flexibility (not peeled ○, peeled x) | ○ | ○ | ○ | ○ | ○ | ○ | ○ |
| | | Cut through temperature (° C.) | 450 | 445 | 420 | 412 | 400 | 402 | 400 |
| | | Cut through temperature increasing rate | 1.50 | 1.48 | 1.40 | 1.37 | 1.33 | 1.34 | 1.33 |
| | | (Concentration of heat resistant-particles in surface)/(Concentration of heat resistant-particles in central portion) | 5.2 | 4.1 | 4.0 | 3.5 | 2.5 | 2.8 | 2.7 |

TABLE 1-continued

|  |  |  | Example No. | | | | | |
|---|---|---|---|---|---|---|---|---|
|  |  |  | 8 | 9 | 10 | 11 | 12 | 13 |
| Electrodeposition liquid | Resin | Acrylic resin | 100 | 100 | 100 | 100 | 100 | 100 |
|  |  | Polyesterimide resin | — | — | — | — | — | — |
|  |  | Polyimide resin | — | — | — | — | — | — |
|  |  | Polyamideimide resin | — | — | — | — | — | — |
|  | Heat-resistant particles | Silica sol (average particle diameter 10 nm) | 110 | — | — | — | — | — |
|  |  | Silica sol (average particle diameter 360 nm) | — | 100 | 80 | 50 | 20 | 1 |
|  |  | Zirconia sol (average particle diameter 100 nm) | — | — | — | — | — | — |
|  |  | Alumina sol (average particle diameter 50 nm) | — | — | — | — | — | — |
|  | Turbidity (mg/L) |  | 30 | 550 | 543 | 252 | 35 | 30 |
|  | Viscosity (cP) |  | 1 | 1 | 1 | 1 | 1 | 1 |
|  | Liquid state |  | Aqueous dispersion | Aqueous dispersion | Aqueous dispersion | Aqueous dispersion | Aqueous dispersion | Aqueous dispersion |
|  | Resin concentration (mass %) |  | 5 | 5 | 5 | 5 | 5 | 5 |
|  | Average particle diameter of resin particles (nm) |  | 50 | 50 | 50 | 50 | 50 | 50 |
| Insulating coating | Flexibility (not peeled o, peeled x) |  | x | o | o | o | o | o |
|  | Cut through temperature (° C.) |  | 450 | 457 | 440 | 420 | 412 | 400 |
|  | Cut through temperature increasing rate |  | 1.50 | 1.52 | 1.47 | 1.40 | 1.37 | 1.33 |
|  | (Concentration of heat resistant-particles in surface)/(Concentration of heat resistant-particles in central portion) |  | 4.3 | 5.8 | 4.2 | 4.0 | 3.5 | 2.6 |

TABLE 2

|  |  |  | Example No. | | | | |
|---|---|---|---|---|---|---|---|
|  |  |  | 14 | 15 | 16 | 17 | 18 |
| Electrodeposition liquid | Resin | Acrylic resin | 100 | 100 | 100 | 100 | 100 |
|  |  | Polyesterimide resin | — | — | — | — | — |
|  |  | Polyimide resin | — | — | — | — | — |
|  |  | Polyamideimide resin | — | — | — | — | — |
|  | Heat-resistant particles | Silica sol (average particle diameter 10 nm) | — | — | — | — | — |
|  |  | Silica sol (average particle diameter 360 nm) | — | — | — | — | — |
|  |  | Zirconia sol (average particle diameter 100 nm) | 100 | 80 | 50 | 20 | 1 |
|  |  | Alumina sol (average particle diameter 50 nm) | — | — | — | — | — |
|  | Turbidity (mg/L) |  | 320 | 315 | 150 | 35 | 30 |
|  | Viscosity (cP) |  | 1 | 1 | 1 | 1 | 1 |
|  | Liquid state |  | Aqueous dispersion | Aqueous dispersion | Aqueous dispersion | Aqueous dispersion | Aqueous dispersion |
|  | Resin concentration (mass %) |  | 5 | 5 | 5 | 5 | 5 |
|  | Average particle diameter of resin particles (nm) |  | 50 | 50 | 50 | 50 | 50 |
| Insulating coating | Flexibility (not peeled o, peeled x) |  | o | o | o | o | o |
|  | Cut through temperature (° C.) |  | 451 | 441 | 422 | 415 | 400 |
|  | Cut through temperature increasing rate |  | 1.50 | 1.47 | 1.40 | 1.38 | 1.33 |
|  | (Concentration of heat resistant-particles in surface)/(Concentration of heat resistant-particles in central portion) |  | 5.0 | 4.2 | 4.0 | 3.6 | 2.1 |

TABLE 2-continued

|  |  |  | Example No. | | | | |
| --- | --- | --- | --- | --- | --- | --- | --- |
|  |  |  | 19 | 20 | 21 | 22 | 23 |
| Electrodeposition liquid | Resin | Acrylic resin | 100 | 100 | 100 | 100 | 100 |
|  |  | Polyesterimide resin | — | — | — | — | — |
|  |  | Polyimide resin | — | — | — | — | — |
|  |  | Polyamideimide resin | — | — | — | — | — |
|  | Heat-resistant particles | Silica sol (average particle diameter 10 nm) | — | — | — | — | — |
|  |  | Silica sol (average particle diameter 360 nm) | — | — | — | — | — |
|  |  | Zirconia sol (average particle diameter 100 nm) | — | — | — | — | — |
|  |  | Alumina sol (average particle diameter 50 nm) | 100 | 80 | 50 | 20 | 1 |
|  | Turbidity (mg/L) |  | 50 | 47 | 40 | 33 | 30 |
|  | Viscosity (cP) |  | 1 | 1 | 1 | 1 | 1 |
|  | Liquid state |  | Aqueous dispersion | Aqueous dispersion | Aqueous dispersion | Aqueous dispersion | Aqueous dispersion |
|  | Resin concentration (mass %) |  | 5 | 5 | 5 | 5 | 5 |
|  | Average particle diameter of resin particles (nm) |  | 50 | 50 | 50 | 50 | 50 |
| Insulating coating | Flexibility (not peeled o, peeled x) |  | o | o | o | o | o |
|  | Cut through temperature (° C.) |  | 450 | 442 | 420 | 413 | 400 |
|  | Cut through temperature increasing rate |  | 1.50 | 1.47 | 1.40 | 1.37 | 1.33 |
|  | (Concentration of heat resistant-particles in surface)/(Concentration of heat resistant-particles in central portion) |  | 5.0 | 4.1 | 3.6 | 3.6 | 2.3 |

TABLE 3

|  |  |  | Example No. | | | | | |
| --- | --- | --- | --- | --- | --- | --- | --- | --- |
|  |  |  | 24 | 25 | 26 | 27 | 28 | 29 |
| Electrodeposition liquid | Resin | Acrylic resin | — | — | — | — | — | — |
|  |  | Polyesterimide resin | 100 | 100 | 100 | 100 | 100 | 100 |
|  |  | Polyimide resin | — | — | — | — | — | — |
|  |  | Polyamideimide resin | — | — | — | — | — | — |
|  | Heat-resistant particles | Silica sol (average particle diameter 10 nm) | 100 | 80 | 50 | 20 | 1 | 1 |
|  |  | Silica sol (average particle diameter 360 nm) | — | — | — | — | — | — |
|  |  | Zirconia sol (average particle diameter 100 nm) | — | — | — | — | — | — |
|  |  | Alumina sol (average particle diameter 50 nm) | — | — | — | — | — | — |
|  | Turbidity (mg/L) |  | 500 | 500 | 500 | 500 | 500 | 520 |
|  | Viscosity (cP) |  | 10 | 10 | 10 | 10 | 10 | 70 |
|  | Liquid state |  | Aqueous dispersion | Aqueous dispersion | Aqueous dispersion | Aqueous dispersion | Aqueous dispersion | Aqueous dispersion |
|  | Resin concentration (mass %) |  | 5 | 5 | 5 | 5 | 5 | 10 |
|  | Average particle diameter of resin particles (nm) |  | 200 | 200 | 200 | 200 | 200 | 200 |
| Insulating coating | Flexibility (not peeled o, peeled x) |  | o | o | o | o | o | o |
|  | Cut through temperature (° C.) |  | 440 | 436 | 436 | 435 | 432 | 432 |
|  | Cut through temperature increasing rate |  | 1.22 | 1.21 | 1.21 | 1.21 | 1.20 | 1.20 |
|  | (Concentration of heat resistant-particles in surface)/(Concentration of heat resistant-particles in central portion) |  | 5.0 | 3.9 | 3.7 | 3.5 | 2.3 | 2.3 |

|  |  |  | Example No. | | | | | |
| --- | --- | --- | --- | --- | --- | --- | --- | --- |
|  |  |  | 30 | 31 | 32 | 33 | 34 | 35 |
| Electrodeposition liquid | Resin | Acrylic resin | — | — | — | — | — | — |
|  |  | Polyesterimide resin | 100 | — | — | — | — | — |

TABLE 3-continued

|  |  |  |  |  |  |  |  |  |
|---|---|---|---|---|---|---|---|---|
|  |  | Polyimide resin | — | 100 | 100 | 100 | 100 | 100 |
|  |  | Polyamideimide resin | — | — | — | — | — | — |
|  | Heat-resistant particles | Silica sol (average particle diameter 10 nm) | 1 | 100 | 80 | 50 | 20 | 1 |
|  |  | Silica sol (average particle diameter 360 nm) | — | — | — | — | — | — |
|  |  | Zirconia sol (average particle diameter 100 nm) | — | — | — | — | — | — |
|  |  | Alumina sol (average particle diameter 50 nm) | — | — | — | — | — | — |
|  |  | Turbidity (mg/L) | 550 | 520 | 520 | 520 | 520 | 520 |
|  |  | Viscosity (cP) | 90 | 10 | 10 | 10 | 10 | 10 |
|  |  | Liquid state | Aqueous dispersion | Aqueous dispersion | Aqueous dispersion | Aqueous dispersion | Aqueous dispersion | Aqueous dispersion |
|  |  | Resin concentration (mass %) | 20 | 5 | 5 | 5 | 5 | 5 |
|  |  | Average particle diameter of resin particles (nm) | 200 | 400 | 400 | 400 | 400 | 400 |
| Insulating coating |  | Flexibility (not peeled o, peeled x) | o | o | o | o | o | o |
|  |  | Cut through temperature (° C.) | 432 | 553 | 550 | 547 | 543 | 540 |
|  |  | Cut through temperature increasing rate | 1.20 | 1.23 | 1.22 | 1.22 | 1.21 | 1.20 |
|  |  | (Concentration of heat resistant-particles in surface)/(Concentration of heat resistant-particles in central portion) | 2.0 | 5.9 | 3.9 | 3.8 | 3.5 | 2.6 |

TABLE 4

|  |  |  | Example No. | | | | |
|---|---|---|---|---|---|---|---|
|  |  |  | 36 | 37 | 38 | 39 | 40 |
| Electrodeposition liquid | Resin | Acrylic resin | — | — | — | — | — |
|  |  | Polyesterimide resin | — | — | — | — | — |
|  |  | Polyimide resin | — | — | — | — | — |
|  |  | Polyamideimide resin | 100 | 100 | 100 | 100 | 100 |
|  | Heat-resistant particles | Silica sol (average particle diameter 10 nm) | 100 | 80 | 50 | 20 | 1 |
|  |  | Silica sol (average particle diameter 360 nm) | — | — | — | — | — |
|  |  | Zirconia sol (average particle diameter 100 nm) | — | — | — | — | — |
|  |  | Alumina sol (average particle diameter 50 nm) | — | — | — | — | — |
|  |  | Turbidity (mg/L) | 510 | 510 | 510 | 510 | 510 |
|  |  | Viscosity (cP) | 10 | 10 | 10 | 10 | 10 |
|  |  | Liquid state | Aqueous dispersion | Aqueous dispersion | Aqueous dispersion | Aqueous dispersion | Aqueous dispersion |
|  |  | Resin concentration (mass %) | 5 | 5 | 5 | 5 | 5 |
|  |  | Average particle diameter of resin particles (nm) | 300 | 300 | 300 | 300 | 300 |
| Insulating coating |  | Flexibility (not peeled o, peeled x) | o | o | o | o | o |
|  |  | Cut through temperature (° C.) | 486 | 485 | 485 | 482 | 480 |
|  |  | Cut through temperature increasing rate | 1.22 | 1.21 | 1.21 | 1.20 | 1.20 |
|  |  | (Concentration of heat resistant-particles in surface)/(Concentration of heat resistant-particles in central portion) | 5.0 | 3.9 | 3.7 | 3.5 | 2.3 |

TABLE 5

|  |  |  | Comparative Example No. | | | | | |
|---|---|---|---|---|---|---|---|---|
|  |  |  | 1 | 2 | 3 | 4 | 5 | 6 |
| Electrodeposition liquid | Resin | Acrylic resin | 100 | — | — | — | — | — |
|  |  | Polyesterimide resin | — | 100 | — | — | 100 | 100 |
|  |  | Polyimide resin | — | — | 100 | — | — | — |
|  |  | Polyamideimide resin | — | — | — | 100 | — | — |
|  | Heat-resistant particles | Silica sol (average particle diameter 10 nm) | — | — | — | — | 20 | 1 |
|  |  | Silica sol (average particle diameter 360 nm) | — | — | — | — | — | — |
|  |  | Zirconia sol (average particle diameter 100 nm) | — | — | — | — | — | — |
|  |  | Alumina sol (average particle diameter 50 nm) | — | — | — | — | — | — |

TABLE 5-continued

| | | Comparative Example No. | | | | | |
|---|---|---|---|---|---|---|---|
| | | 1 | 2 | 3 | 4 | 5 | 6 |
| | Turbidity (mg/L) | 30 | 500 | 520 | 510 | <0.01 | 500 |
| | Viscosity (cP) | 1 | 10 | 10 | 10 | >1000 | 120 |
| | Liquid state | Aqueous dispersion | Aqueous dispersion | Aqueous dispersion | Aqueous dispersion | Liquid in which resin component is dissolved | Aqueous dispersion |
| | Resin particle concentration or resin concentration (mass %) | 5 | 5 | 5 | 5 | 5 | 40 |
| | Average particle diameter of resin particles (nm) | 50 | 200 | 400 | 300 | Measuring not possible since resin dissolved | 200 |
| Insulating coating | Flexibility (not peeled ○, peeled x) | ○ | ○ | ○ | ○ | Coating of insulating layer was not formed by electrodeposition method | Liquid solidified, electrodeposition was not possible |
| | Cut through temperature (° C.) | 300 | 360 | 450 | 400 | — | — |
| | Cut through temperature increasing rate (Concentration of heat resistant-particles in surface)/(Concentration of heat resistant-particles in central portion) | 1 Measuring not possible since therewere no heat-resistant particles | 1 Measuring not possible since there were no heat-resistant particles | 1 Measuring not possible since there were no heat-resistant particles | 1 Measuring not possible since there were no heat-resistant particles | — | — |

(Note)
In the column for resin particle concentration or resin concentration, Comparative Examples 1 to 4, and 6 refer to resin particle concentration, and Comparative Example 5 refers to resin concentration.

INDUSTRIAL APPLICABILITY

The present invention provides a heat-resistant insulated wire with excellent heat resistance in the vicinity of the surface of an insulating layer, and an electrodeposition liquid for forming the insulating layer. Therefore, the present invention has industrial applicability.

REFERENCE SIGNS LIST

10 COPPER WIRE
20 INSULATING LAYER
30 HEAT-RESISTANT PARTICLES

What is claimed is:

1. An electrodeposition liquid for forming an insulating layer of a heat-resistant insulated wire, wherein
    the insulating layer contains heat-resistant particles that are densely dispersed in a surface region of the insulating layer,
    the electrodeposition liquid is a suspension, and
    the heat-resistant particles and resin particles are dispersed in the suspension which has a viscosity of 100 cP or less and a turbidity of 1 mg/L or more.

2. The electrodeposition liquid for forming an insulating layer according to claim 1, wherein an amount of the resin particles is 1 to 30% by mass and an amount of the heat-resistant particles is 1 to 100 parts by mass with respect to 100 parts by mass of the resin particles.

3. The electrodeposition liquid for forming an insulating layer according to claim 2,
    wherein the resin particles are an acrylic resin, a polyesterimide resin, a polyimide resin, or a polyamideimide resin.

4. The electrodeposition liquid for forming an insulating layer according to claim 2,
    wherein the heat-resistant particles are at least one kind of metal oxide fine particles or silica fine particles.

5. The electrodeposition liquid for forming an insulating layer according to claim 1,
    wherein an average particle diameter of the resin particles is 1 μm or less and an average particle diameter of the heat-resistant particles is 500 nm or less.

6. The electrodeposition liquid for forming an insulating layer according to claim 1, which forms an insulating layer in which a cut through temperature increasing rate of the insulating layer is 1.2 or more.

* * * * *